United States Patent
Chang et al.

(10) Patent No.: US 10,289,427 B2
(45) Date of Patent: May 14, 2019

(54) RESET DEVICE AND METHOD OF POWER OVER ETHERNET SYSTEM

(71) Applicant: SENAO NETWORKS, INC., Taoyuan (TW)

(72) Inventors: Ming-Tao Chang, Taoyuan (TW);
Pi-Kuang Ku, Taoyuan (TW);
Wen-Tang Lee, Taoyuan (TW)

(73) Assignee: SENAO NETWORKS, INC., Taoyuan (TW)

( * ) Notice: Subject to any disclaimer, the term of this patent is extended or adjusted under 35 U.S.C. 154(b) by 107 days.

(21) Appl. No.: 15/484,125

(22) Filed: Apr. 10, 2017

(65) Prior Publication Data
US 2018/0293082 A1 Oct. 11, 2018

(51) Int. Cl.
| | |
|---|---|
| *G06F 1/24* | (2006.01) |
| *G06F 9/4401* | (2018.01) |
| *G06F 1/26* | (2006.01) |
| *G06F 1/28* | (2006.01) |
| *G06F 1/30* | (2006.01) |

(52) U.S. Cl.
CPC ............ *G06F 9/4416* (2013.01); *G06F 1/24* (2013.01); *G06F 1/266* (2013.01); *G06F 1/28* (2013.01); *G06F 1/30* (2013.01)

(58) Field of Classification Search
CPC .......... G06F 9/4416; G06F 1/266; G06F 1/24; G06F 1/30; G06F 1/28
See application file for complete search history.

(56) References Cited

U.S. PATENT DOCUMENTS

| | | | | |
|---|---|---|---|---|
| 4,625,274 A | * | 11/1986 | Schroeder | H04M 1/727 713/1 |
| 7,668,572 B2 | | 2/2010 | Van de Water | |
| 8,108,723 B2 | | 1/2012 | Diab | |
| 9,531,550 B2 | | 12/2016 | Jabbaz et al. | |
| 2006/0041811 A1 | * | 2/2006 | Hsieh | G01R 31/3163 714/742 |
| 2008/0106308 A1 | * | 5/2008 | Tu | G06F 1/24 327/143 |
| 2012/0117410 A1 | * | 5/2012 | Jeong | H03K 17/223 713/340 |
| 2014/0028360 A1 | * | 1/2014 | Lee | H03L 7/00 327/143 |

FOREIGN PATENT DOCUMENTS

CN 103959707 A 7/2014

* cited by examiner

*Primary Examiner* — Jaweed A Abbaszadeh
*Assistant Examiner* — Gayathri Sampath
(74) *Attorney, Agent, or Firm* — CKC & Partners Co., LLC

(57) ABSTRACT

A Power over Ethernet (PoE) system that includes a power source, an Ethernet transmission line, a powered device and a reset device is provided. The power source is configured to generate an electric power signal having a power level. The powered device is configured to receive the electric power signal through the Ethernet transmission line. The reset device includes a power terminal and a reset circuit. The power terminal is electrically coupled to the Ethernet transmission line. The reset circuit is electrically coupled between the power terminal and a ground terminal. Upon receiving a control signal, the reset circuit is configured to vary a voltage level of the electric power signal from the power level to a non-zero reset level for a predetermined time period to reset the powered device.

15 Claims, 2 Drawing Sheets

RESET DEVICE AND METHOD OF POWER OVER ETHERNET SYSTEM

BACKGROUND

Field of Invention

The present invention relates to a Power over Ethernet technology. More particularly, the present invention relates to a reset device and method of a Power over Ethernet system.

Description of Related Art

Ethernet communications provide high speed data communications over a communications link between two communications nodes that operates according the IEEE 802.3 Ethernet Standard. The communications medium between the two nodes can be twisted pair wires for Ethernet, or other types communications medium that are appropriate. Power over Ethernet (PoE) communication systems provide power and data communications over a common communications link. More specifically, a power source device (PSE) connected to the physical layer of the first node of the communications link provides DC power to a powered device (PD) at the second node of the communications link. The DC power is transmitted simultaneously over the same communications medium with the high speed data from one node to the other node.

The powered device may include a reset button to trigger a reset mechanism of the powered device. However, the physical button on the powered device may be physically inaccessible when the powered device is placed inside an enclosure or on a remote location.

Accordingly, what is needed is a reset device and method of a power over Ethernet system to provide a remote reset mechanism.

SUMMARY

The invention provides a reset device used in a Power over Ethernet system that includes a power terminal and a reset circuit. The power terminal is electrically coupled to an Ethernet transmission line that transmits an electric power signal having a power level from a power source to a powered device. The reset circuit is electrically coupled between the power terminal and a ground terminal. Upon receiving a control signal, the reset circuit is configured to vary a voltage level of the electric power signal from the power level to a non-zero reset level for a predetermined time period to reset the powered device.

Another aspect of the present invention is to provide a Power over Ethernet system that includes a power source, an Ethernet transmission line, a powered device and a reset device. The power source is configured to generate an electric power signal having a power level. The powered device is configured to receive the electric power signal through the Ethernet transmission line. The reset device includes a power terminal and a reset circuit. The power terminal is electrically coupled to the Ethernet transmission line. The reset circuit is electrically coupled between the power terminal and a ground terminal. Upon receiving a control signal, the reset circuit is configured to vary a voltage level of the electric power signal from the power level to a non-zero reset level for a predetermined time period to reset the powered device.

Yet another aspect of the present invention is to provide a reset method used in a Power over Ethernet system to reset a powered device thereof that includes the steps outlined below. An electric power signal having a power level is generated by a power source of the Power over Ethernet system. The electric power signal is received through an Ethernet transmission line by a powered device. A control signal is received by a reset circuit of a reset device of the Power over Ethernet system, wherein the reset circuit is electrically coupled between a power terminal and a ground terminal, and the power terminal is electrically coupled to the Ethernet transmission line. A voltage level of the electric power signal is varied from the power level to a non-zero reset level for a predetermined time period to reset the powered device by the reset circuit.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the invention. Drawings are for the purpose of illustration only, and not plotted in accordance with the original size.

As used herein, the terms "first", "second" and the like, etc., are used to describe various elements, components, regions, layers and/or blocks can be understood. However, these elements, components, regions, layers and/or blocks should not be limited by these terms. The terms are used to identify a single element. Therefore, in the following a first element, component, region, layer, and/or blocks may also be termed a second element, component, region, layer, and/or blocks, without departing from the intent of the present disclosure.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
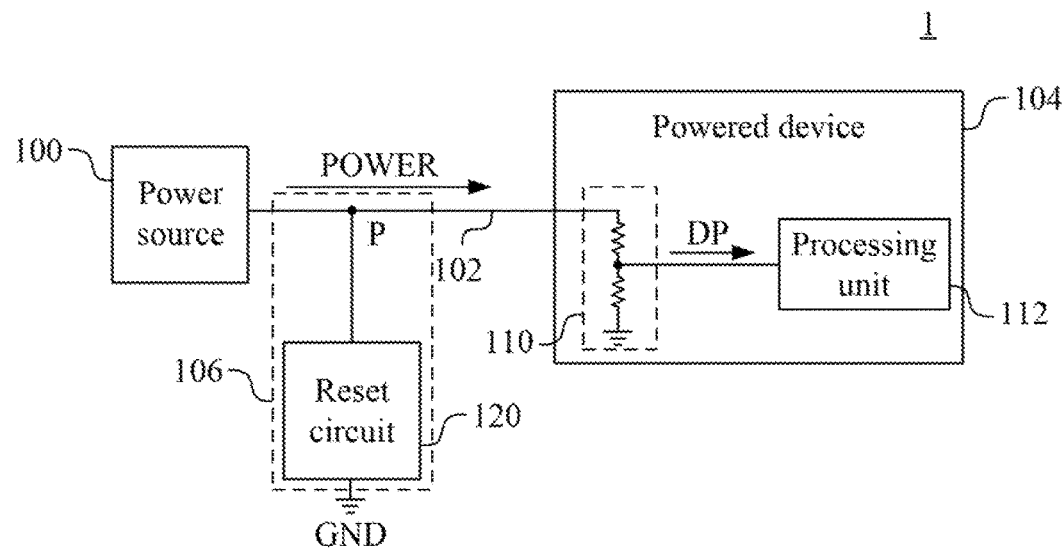
FIG. 1 is a block diagram of a Power over Ethernet (PoE) system in an embodiment of the present invention.

Reference is now made to FIG. 1. FIG. 1 is a block diagram of a Power over Ethernet (PoE) system 1 in an embodiment of the present invention. The Power over Ethernet system 1 includes a power source 100, an Ethernet transmission line 102, a powered device 104 and a reset device 106.

In an embodiment, the power source 100 can be a power source device (PSE) equipped with Power over Ethernet technology and be configured to generate an electric power signal POWER and transfer communication signals to the powered device 104. In an embodiment, the power source 100 is a Power over Ethernet injector.

The powered device 104 is configured to receive the electric power signal POWER through the Ethernet transmission line 102, in which the Ethernet transmission line 102 can be such as, but not limited to an Ethernet cable. In an embodiment, the powered device 104 can be such as, but not limited to a wireless transceiver.

In an embodiment, the powered device 104 includes a voltage-dividing module 110 and a processing module 112.

The voltage-dividing module 110 is configured to receive and divide the electric power signal POWER to generate a divided electric power signal DP. In the present embodiment, the voltage-dividing module 110 is illustrated as two resistors electrically coupled in series. However, the present invention is not limited thereto.

In an embodiment, the electric power signal 101 has a power level, in which the power level can be such as, but not limited to 56 volts. The divided electric power signal DP has a divided power level, in which the divided power level depends on the design of the voltage-dividing module 110 and can be such as, but not limited to 3.21 volts.

The processing module 112 is configured to operate according to the divided electric power signal DP.

The reset device 106 includes a power terminal P and a reset circuit 120. The power terminal P is electrically coupled to the Ethernet transmission line 102. The reset circuit 120 is electrically coupled between the power terminal P and a ground terminal GND to vary a voltage level of the electric power signal POWER from the power level to a non-zero reset level for a predetermined time period to reset the powered device 104.

Figures 2A, 2B:
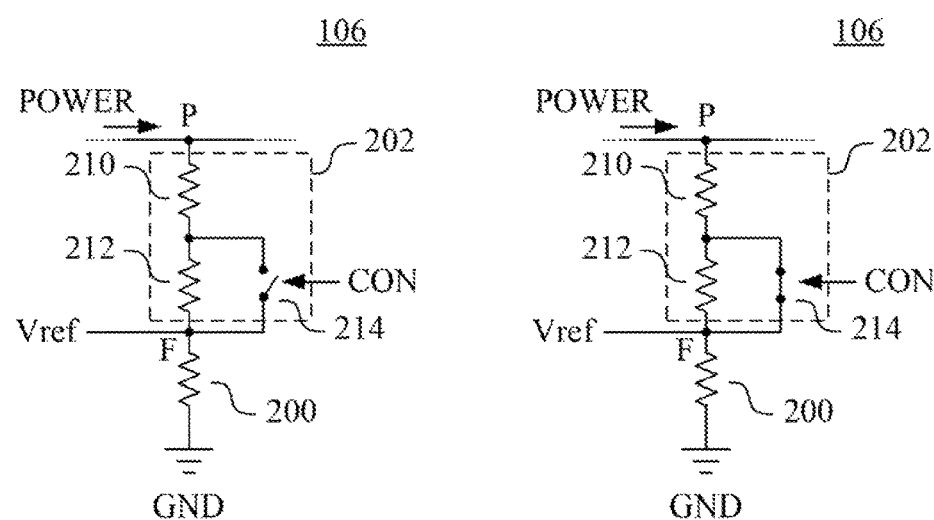
FIG. 2A and FIG. 2B are block diagrams of reset device under different operation status respectively in an embodiment of the present invention

Reference is now made to FIG. 2A and FIG. 2B. FIG. 2A and FIG. 2B are block diagrams of reset device 106 under different operation status respectively in an embodiment of the present invention.

The operation of the reset mechanism is further described in detail by using FIG. 2A and FIG. 2B together with FIG. 1.

As illustrated in FIG. 2A, the reset circuit 120 includes a fixed terminal F, a resistive circuit 200 and a variable resistive circuit 202.

The fixed terminal F is configured to receive a fixed voltage Vref such that the voltage level of the fixed terminal F is maintained at the fixed voltage Vref.

The resistive circuit 200 is electrically coupled between the fixed terminal F and the ground terminal GND. In an embodiment, the resistance of the resistive circuit 200 is not varied. It is appreciated that though the resistive circuit 200 is illustrated as a single resistor in FIG. 2, the resistive circuit 200 can actually include a combination of resistors electrically coupled in parallel and/or in series. The present invention is not limited thereto.

The variable resistive circuit 202 is electrically coupled between the power terminal P and the fixed terminal F. The variable resistive circuit 202 is configured to receive a control signal CON to vary a resistive value thereof to vary the voltage level of the electric power signal POWER from the power level to the reset level.

In an embodiment, the variable resistive circuit 202 includes a first resistive unit 210, a second resistive unit 212 and a switch 214. The second resistive unit 212 is electrically coupled to the first resistive unit 210 in series. The switch 214 is electrically coupled in parallel with the second resistive unit 212.

In an embodiment, when the voltage level of the electric power signal POWER is Vo, the resistive value of the resistive circuit 200 is R1 and the resistive value of the variable resistive circuit 202 is R2, the relation between the voltage level Vo of the electric power signal POWER and the voltage level of the voltage level of the fixed voltage Vref is expressed as:

$$Vo = Vref*((R1+R2)/R1) \quad \text{(Equation 1)}$$

Since R1 is not varied and Vref is fixed, Vo is determined only based on the resistive value R2 of the variable resistive circuit 202.

In operation, under the normal power-supplying condition of the power source 100, the control signal CON controls the switch 214 to be unconducted. As a result, the switch 214 becomes an open circuit such that the second resistive unit 212 is activated.

Under the condition that the reset mechanism is triggered, the control signal CON controls the switch 214 to be conducted. As a result, the switch 214 becomes a short circuit such that the switch 214 and the second resistive unit 212 form a short circuit. The resistive value R2 of the of the variable resistive circuit 202 decreases to zero, such that the total resistive value R1+R2 of the first resistive unit 210 and the second resistive unit 212 decreases.

Subsequently, the voltage level Vo of the electric power signal POWER decreases from the power level to the reset level that is lower than the power level due to Equation 1.

In an embodiment, the reset level can be such as, but not limited to 52 volts. Under such a condition, the voltage-dividing module 110 in FIG. 1 may divide such of the reset level to a divide reset level such as, but not limited to 2.57 volts.

Further, in an embodiment, the control signal CON controls the switch 214 to be conducted for a predetermined time period such as, but not limited to three seconds. After the predetermined time period, the control signal CON controls the switch 214 to be unconducted again such that the voltage level Vo of the electric power signal POWER recovers to the power level.

As a result, when the processing module 112 in FIG. 1 detects the voltage level of the divided electric power signal DP varies from the divided power level to the divided reset level for the predetermined time period, the processing module 112 resets the powered device 104.

In some approaches, the polarity of the electric power signal POWER is used to trigger the reset mechanism. However, when the polarity of the electric power signal POWER switches, a short-circuit condition may occur to the powered device 104 to cause abnormal operation condition. Compared to the approaches mentioned above, the reset device 106 can trigger the reset mechanism without affecting the operation of the powered device 104.

It is appreciated that the configuration of the reset device 106, the voltage levels of the electric power signal POWER and the divided electric power signal DP and the duration of the predetermined time period descried above are merely an example.

In other embodiments, the configuration of the reset device 106, the voltage levels of the electric power signal POWER and the divided electric power signal DP and the duration of the predetermined time period can be different. The present invention is not limited to. For example, the variable resistive circuit 202 of the reset device 106 may be implemented by such as, but not limited to a variable resistor to vary the resistive value thereof.

In an embodiment, the switch 214 can operate in a way opposite to that described above. More specifically, under the normal power-supplying condition of the power source 100, the control signal CON controls the switch 214 to be conducted to short-circuit the second resistive unit 212. Under the condition that the reset mechanism is triggered, the control signal CON controls the switch 214 to be unconducted to activate the second resistive unit 212.

As a result, when the reset mechanism is triggered, the total resistive value R1+R2 of the first resistive unit 210 and the second resistive unit 212 increases such that such that the voltage level of the electric power signal increases from the power level to the reset level that is higher than the power level.

Figure 3:
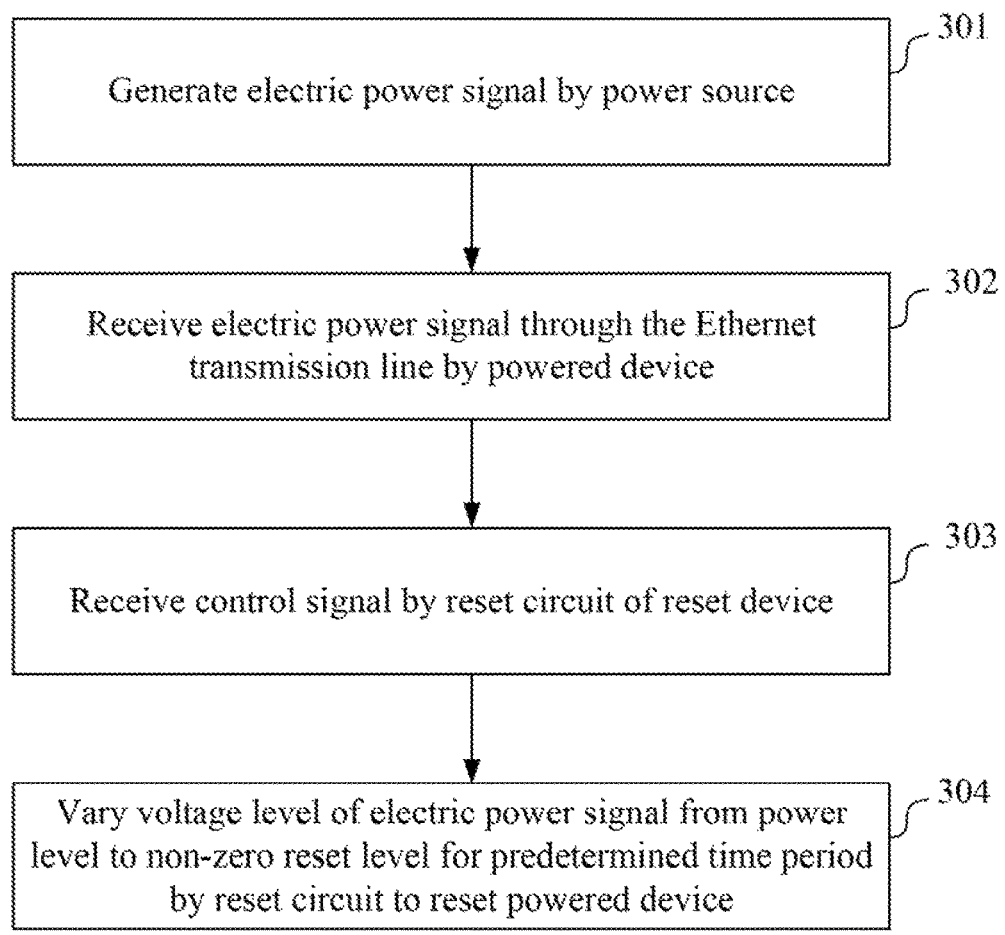
FIG. 3 is a flow chart of a reset method in an embodiment of the present invention.

Reference is now made to FIG. 3. FIG. 3 is a flow chart of a reset method 300 in an embodiment of the present invention. The reset method 300 can be used in the used in the Power over Ethernet system 1 illustrated in FIG. 1. Reference is made to FIG. 1 for ease of understanding. The reset method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In operation 301, the electric power signal POWER is generated by the power source 100.

In operation 302, the electric power signal POWER is received through the Ethernet transmission line 102 by the powered device 104.

In operation 303, the control signal CON is received by the reset circuit 120 of the reset device 106.

In operation 304, the voltage level of the electric power signal POWER is varied from the power level to the non-zero reset level for the predetermined time period by the reset circuit 120 to reset the powered device 104.

It is appreciated that each of the resistors illustrated in FIG. 1, FIG. 2A and FIG. 2B are merely an example. In other embodiments, the resistive circuit 200, the variable resistive circuit 202 and the voltage-dividing module 110 may include other resistive components such as, but not limited to capacitors or inductors.

Moreover, in an embodiment, the power source 100 can also vary the voltage level of the electric power signal POWER to the reset level for a predetermined time period such that the processing module 112 of the powered device 104 detects the variation so as to trigger the reset mechanism.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A reset device used in a Power over Ethernet system comprising:
   a power terminal electrically coupled to an Ethernet transmission line that transmits an electric power signal having a power level from a power source to a powered device; and
   a reset circuit electrically coupled between the power terminal and a ground terminal, wherein the reset circuit comprises:
   a fixed terminal configured to receive a fixed voltage;
   a resistive circuit electrically coupled between the fixed terminal and the ground terminal; and
   a variable resistive circuit electrically coupled between the power terminal and the fixed terminal;
   wherein the variable resistive circuit is configured to receive a control signal to vary a resistive value thereof to vary a voltage level of the electric power signal from the power level to a non-zero reset level;
   wherein upon receiving the control signal, the reset circuit is configured to vary the voltage level of the electric power signal from the power level to the non-zero reset level for a predetermined time period to reset the powered device.

2. The reset device of claim 1, wherein the variable resistive circuit comprises:
   a first resistive unit;
   a second resistive unit electrically coupled to the first resistive unit in series; and
   a switch electrically coupled in parallel with the second resistive unit.

3. The reset device of claim 2, wherein when the control signal controls the switch to be conducted, the switch and the second resistive unit form a short circuit such that the voltage level of the electric power signal decreases from the power level to the non-zero reset level.

4. The reset device of claim 2, wherein when the control signal controls the switch to be unconducted, the second resistive unit is activated such that the voltage level of the electric power signal increases from the power level to the non-zero reset level.

5. A Power over Ethernet system comprising:
   a power source configured to generate an electric power signal having a power level;
   an Ethernet transmission line;
   a powered device configured to receive the electric power signal through the Ethernet transmission line; and
   a reset device comprising:
   a power terminal electrically coupled to the Ethernet transmission line; and
   a reset circuit electrically coupled between the power terminal and a ground terminal, wherein the reset circuit comprises:
   a fixed terminal configured to receive a fixed voltage;
   a resistive circuit electrically coupled between the fixed terminal and the ground terminal; and
   a variable resistive circuit electrically coupled between the power terminal and the fixed terminal;
   wherein the variable resistive circuit is configured to receive a control signal to vary a resistive value thereof to vary a voltage level of the electric power signal from the power level to a non-zero reset level;
   wherein upon receiving the control signal, the reset circuit is configured to vary the voltage level of the electric power signal from the power level to the non-zero reset level for a predetermined time period to reset the powered device.

6. The Power over Ethernet system of claim 5, wherein the variable resistive circuit comprises:
   a first resistive unit;
   a second resistive unit electrically coupled to the first resistive unit in series; and
   a switch electrically coupled in parallel with the second resistive unit.

7. The Power over Ethernet system of claim 6, wherein when the control signal controls the switch to be conducted, the switch and the second resistive unit form a short circuit such that the voltage level of the electric power signal decreases from the power level to the non-zero reset level.

8. The Power over Ethernet system of claim 6, wherein when the control signal controls the switch to be unconducted, the second resistive unit is activated such that the voltage level of the electric power signal increases from the power level to the non-zero reset level.

9. The Power over Ethernet system of claim 5, wherein the reset device is disposed in a Power over Ethernet injector.

10. The Power over Ethernet system of claim 5, wherein the powered device comprises:
    a voltage-dividing module configured to receive and divide the electric power signal to generate a divided electric power signal having a divided power level; and
    a processing module configured to detect the voltage level of the divided electric power signal;
    when the processing module detects that the voltage level of the divided electric power signal varies from the divided power level to a divided non-zero reset level for the predetermined time period, the processing module resets the powered device.

11. A reset method used in a Power over Ethernet system to reset a powered device thereof comprising:
    generating an electric power signal having a power level by a power source of the Power over Ethernet system;
    receiving the electric power signal through an Ethernet transmission line by the powered device;
    receiving a control signal by a reset circuit of a reset device of the Power over Ethernet system, wherein the reset circuit is electrically coupled between a power terminal and a ground terminal, and the power terminal is electrically coupled to the Ethernet transmission line; and
    varying a voltage level of the electric power signal from the power level to a non-zero reset level for a predetermined time period to reset the powered device by the reset circuit, wherein the reset circuit comprises a fixed terminal configured to receive a fixed voltage, a resistive circuit electrically coupled between the fixed terminal and the ground terminal and a variable resistive circuit electrically coupled between the power terminal and the fixed terminal, the reset method further comprises:
    receiving the control signal to vary a resistive value thereof to vary the voltage level of the electric power signal from the power level to the non-zero reset level.

12. The reset method of claim 11, wherein the variable resistive circuit comprises a first resistive unit, a second resistive unit electrically coupled to the first resistive unit in series and a switch electrically coupled in parallel with the second resistive unit.

13. The reset method of claim 12, wherein the reset method further comprises:
    controlling the switch to be conducted by the control signal; and forming a short circuit by the switch and the second resistive unit such that the voltage level of the electric power signal decreases from the power level to the non-zero reset level.

14. The reset method of claim 12, wherein the reset method further comprises:
    controlling the switch to be unconducted by the control signal; and activating the second resistive unit such that the voltage level of the electric power signal increases from the power level to the non-zero reset level.

15. The reset method of claim 11, wherein the powered device comprises a voltage-dividing module configured to receive and divide the electric power signal to generate a divided electric power signal having a divided power level, and a processing module configured to detect the voltage level of the divided electric power signal, the reset method further comprises:
    detecting that the voltage level of the divided electric power signal varies from the divided power level to a divided non-zero reset level for the predetermined time period by the processing module;
    resetting the powered device by the processing module.

* * * * *